United States Patent
Kinoshita et al.

(10) Patent No.: US 8,008,810 B2
(45) Date of Patent: Aug. 30, 2011

(54) PHASE-CONTROL SWITCHING APPARATUS AND SWITCHING CONTROL METHOD FOR PHASE-CONTROL SWITCHING APPARATUS

(75) Inventors: Sadayuki Kinoshita, Tokyo (JP); Kenji Kamei, Tokyo (JP); Haruhiko Koyama, Tokyo (JP); Tomohito Mori, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 204 days.

(21) Appl. No.: 12/527,230

(22) PCT Filed: Apr. 20, 2007

(86) PCT No.: PCT/JP2007/058624
§ 371 (c)(1),
(2), (4) Date: Aug. 14, 2009

(87) PCT Pub. No.: WO2008/136071
PCT Pub. Date: Nov. 13, 2008

(65) Prior Publication Data
US 2010/0085668 A1    Apr. 8, 2010

(51) Int. Cl.
*H01F 13/00* (2006.01)
*H01F 27/42* (2006.01)
*H02P 9/12* (2006.01)
(52) U.S. Cl. ................................................. 307/101
(58) Field of Classification Search .............. 307/101, 307/116, 125; 361/35
See application file for complete search history.

(56) References Cited

U.S. PATENT DOCUMENTS

| | | | |
|---|---|---|---|
| 6,392,390 B1 | 5/2002 | Ito et al. | |
| 6,493,203 B1 | 12/2002 | Ito et al. | |
| 7,095,139 B2 * | 8/2006 | Tsutada et al. | 307/129 |

FOREIGN PATENT DOCUMENTS

| | | |
|---|---|---|
| JP | 2-179220 A | 7/1990 |
| JP | 2001-218354 A | 8/2001 |
| JP | 2003-232840 A | 8/2003 |
| JP | 2005-204368 A | 7/2005 |
| JP | 2006-284261 A | 10/2006 |
| WO | WO 2007/088588 A1 | 8/2007 |

OTHER PUBLICATIONS

International Search Report (PCT/ISA/210) for PCT/JP2007/058624 completed Jun. 5, 2007.
Written Opinion (PCT/ISA/237) for PCT/JP2007/058624 completed Jun. 5, 2007.

* cited by examiner

*Primary Examiner* — Jared J Fureman
*Assistant Examiner* — Carlos Amaya
(74) *Attorney, Agent, or Firm* — Buchanan Ingersoll & Rooney PC

(57) ABSTRACT

A residual-magnetic-flux calculating unit includes a voltage-change-rate detecting unit that detects a transformer-voltage change rate from a phase voltage between a breaker and a transformer, a residual-magnetic-flux detecting unit that detects a residual magnetic flux remaining on the transformer based on the phase voltage, and a breaker-switching-state identifying unit that detects a switching state of the breaker. The residual-magnetic-flux calculating unit recalculates the residual magnetic flux based on the transformer-voltage change rate and a predetermined threshold while the breaker is in an open state.

9 Claims, 7 Drawing Sheets

PHASE-CONTROL SWITCHING APPARATUS AND SWITCHING CONTROL METHOD FOR PHASE-CONTROL SWITCHING APPARATUS

TECHNICAL FIELD

The present invention relates to a phase-control switching apparatus that suppresses the generation of a transient exciting inrush current in a transformer connected to an electric power system via a power switching device such as a breaker and a switching control method for the phase-control switching apparatus.

BACKGROUND ART

Conventionally, a phase-control switching apparatus has been known that can suppress the generation of a transient voltage or current to the minimum by predicting a residual magnetic flux for each phase of a three-phase transformer based on the cutoff sequence of the three-phase transformer that is connected to an electric power system via a breaker and by closing the breaker at an optimum timing according to the predicted residual magnetic flux (for example, Patent Document 1).

Moreover, a phase-control switching apparatus has been known that can suppress the generation of a transient voltage or current to the minimum by calculating a residual magnetic flux for each phase of a transformer when a breaker receives an open instruction that acts as a trigger and by closing the breaker at an optimum timing according to the calculated residual magnetic flux (for example, Patent Document 2). In this case, the residual magnetic flux is calculated based on a voltage value for each phase of the transformer around the reception of the open instruction that is measured by a voltage measuring unit located on the transformer side of the breaker for each phase.

Patent Document 1: Japanese Patent Application Laid-open No. 2001-218354 (FIG. 1, FIG. 4, etc.)
Patent Document 2: Japanese Patent Application Laid-open No. 2005-204368 (FIG. 1, FIG. 2, etc.)

DISCLOSURE OF INVENTION

Problem to be Solved by the Invention

The conventional phase-control switching apparatus controls a closing phase of a breaker in consideration of only a residual magnetic flux when a three-phase transformer is cut off. However, when a breaker for transformer includes an interpolar capacitor, the voltage and the magnetic flux of the transformer fluctuates in some cases due to the interpolar capacitor even if the breaker for transformer is an open state. For example, the fluctuation occurs when a source voltage fluctuates largely due to a power system trouble or the like. For this reason, the conventional phase-control switching apparatus has a problem in that the generation of a transient voltage or current cannot be suppressed to the minimum even if the breaker is closed at an optimum timing according to a residual magnetic flux that is predicted when the transformer is cut off.

The present invention has been achieved in view of the above problems, and an object of the invention is to provide a phase-control switching apparatus, which can suppress the generation of an exciting inrush current generated when a breaker for transformer is closed even if the breaker for transformer includes an interpolar capacitor, and a switching control method for the phase-control switching apparatus.

Means for Solving Problem

To solve the above problems and to achieve the object, a phase-control switching apparatus according to the present invention includes a breaker that is connected between an electric power system and a transformer and is controlled to open or close to cut off or energize the transformer; a voltage measuring unit that measures each phase voltage between the breaker and the transformer; a residual-magnetic-flux calculating unit that includes a residual-magnetic-flux detecting unit that detects a residual magnetic flux remaining on the transformer based on a transformer voltage measured by the voltage measuring unit; and a control unit that controls a switching timing of the breaker based on the residual magnetic flux detected by the residual-magnetic-flux detecting unit. The residual-magnetic-flux calculating unit further includes a voltage-change-rate detecting unit that detects a transformer-voltage change rate for each phase obtained by differentiating the phase voltage measured by the voltage measuring unit with respect to time, and a breaker-switching-state identifying unit that detects a switching state of the breaker. The residual-magnetic-flux detecting unit determines whether to recalculate the residual magnetic flux based on the transformer-voltage change rate detected by the voltage-change-rate detecting unit while the breaker-switching-state identifying unit identifies that the breaker is in an open state and sets a residual magnetic flux obtained by recalculation as a new residual magnetic flux.

Effect of the Invention

According to the present invention, the phase-control switching apparatus detects a voltage change rate of the transformer for each phase, which is obtained by differentiating each phase voltage measured by the voltage measuring unit with respect to time, determines whether a residual magnetic flux is recalculated based on the voltage change rate of the transformer detected by the voltage-change-rate detecting unit when it is determined that the breaker is in an open state, and sets the recalculated residual magnetic flux as a new residual magnetic flux when it is determined that the recalculation of the residual magnetic flux is required. Therefore, the generation of a transient exciting inrush current flowing into the transformer connected to the electric power system can be suppressed.

EXPLANATIONS OF LETTERS OR NUMERALS

| | |
|---|---|
| 10 | breaker |
| 12 | contactor |
| 20 | interpolar capacitor |
| 30 | transformer |
| 35 | voltage measuring unit |
| 50a, 50b | residual-magnetic-flux calculating unit |
| 51 | breaker-switching-state identifying unit |
| 52a, 52b | voltage-change-rate detecting unit |
| 53 | residual-magnetic-flux detecting unit |
| 55 | calculation/operation control unit |

BEST MODE(S) FOR CARRYING OUT THE INVENTION

Exemplary embodiments of a phase-control switching apparatus according to the present invention will be explained below in detail with reference to the accompanying drawings. The present invention is not limited to the embodiments explained below.

First Embodiment

Configuration of Apparatus

Figure 1:
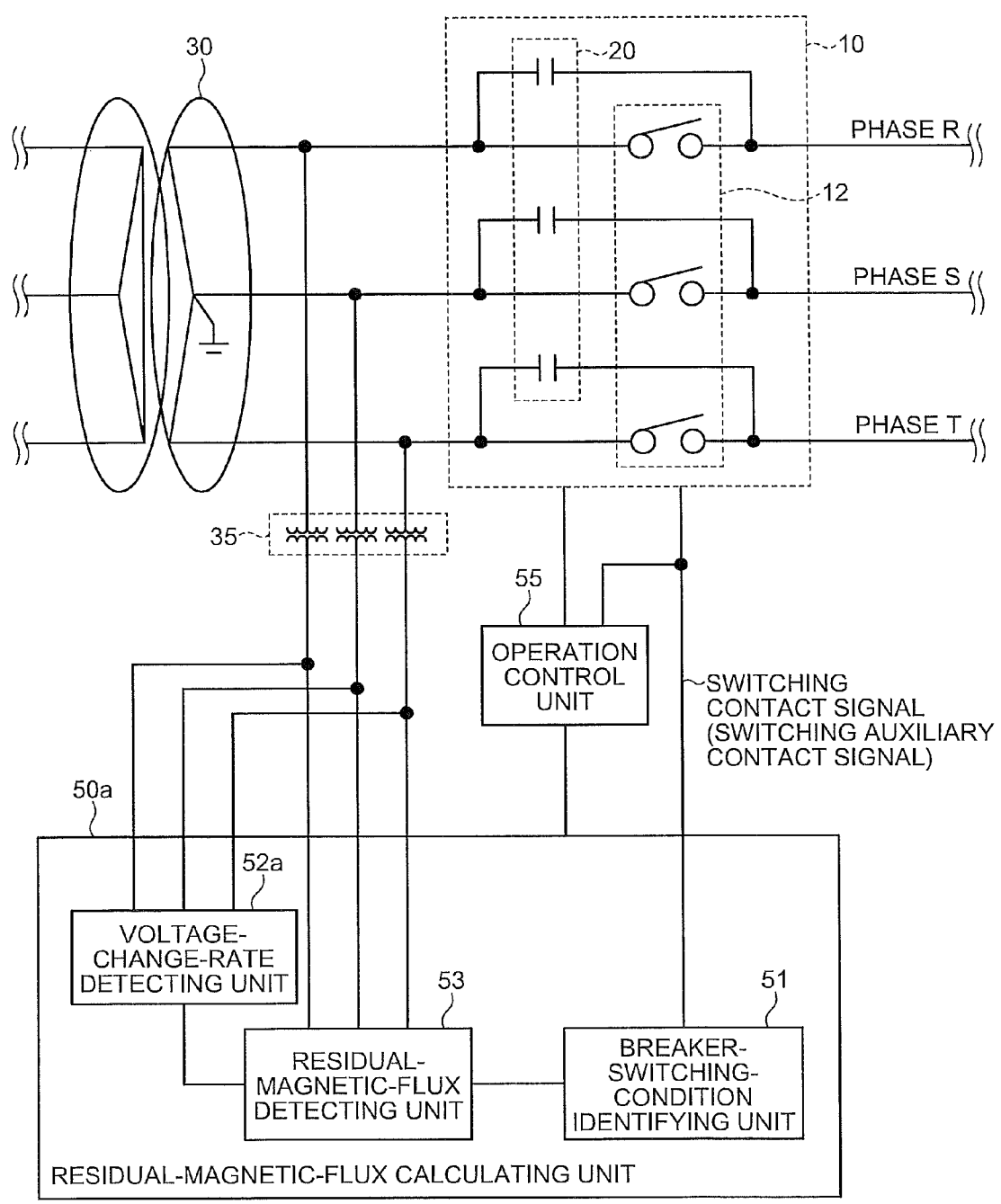
FIG. 1 is a schematic diagram illustrating a configuration of a relevant portion of a phase-control switching apparatus according to a first embodiment of the present invention.

FIG. 1 is a schematic diagram illustrating a configuration of a relevant portion of a phase-control switching apparatus according to a first embodiment of the present invention. The phase-control switching apparatus includes a breaker 10, a calculation/operation control unit 55, and a residual-magnetic-flux calculating unit 50a. The breaker 10 is a three-phase switching device, and is connected between a transformer 30 shown on the left side of FIG. 1 and lines (R phase, S phase, and T phase) of an electric power system shown on the right side of FIG. 1. The breaker 10 includes contactors 12 that can independently be switched for three phases and interpolar capacitors 20 that are provided between both poles of the contactors 12. Furthermore, a voltage measuring unit 35 that measures a voltage of each phase as a transformer voltage is provided on the transformer 30 side of the breaker 10.

The residual-magnetic-flux calculating unit 50a has a function of calculating an amount of magnetic flux (hereinafter, "a residual magnetic flux") remaining on the transformer 30. The residual-magnetic-flux calculating unit 50a includes a voltage-change-rate detecting unit 52a, a residual-magnetic-flux detecting unit 53, and a breaker-switching-state identifying unit 51. The voltage-change-rate detecting unit 52a detects a rate of change of a transformer voltage based on the output of the voltage measuring unit 35. The residual-magnetic-flux detecting unit 53 detects a residual magnetic flux of the transformer 30 based on the transformer voltage measured by the voltage measuring unit 35. The breaker-switching-state identifying unit 51 operates based on a switching contact signal that is supplied from the breaker 10 to the residual-magnetic-flux calculating unit 50a. The switching contact signal can be a switching auxiliary contact signal. The calculation/operation control unit 55 has a function of controlling a switching timing for each phase of the breaker 10 based on the residual magnetic flux calculated by the residual-magnetic-flux calculating unit 50a. In this case, the residual-magnetic-flux calculating unit 50a and the calculation/operation control unit 55 can be configured individually or integrally, for example, by using a microcomputer, a control processor, or the like.

(Operation of Apparatus)

Figure 2:
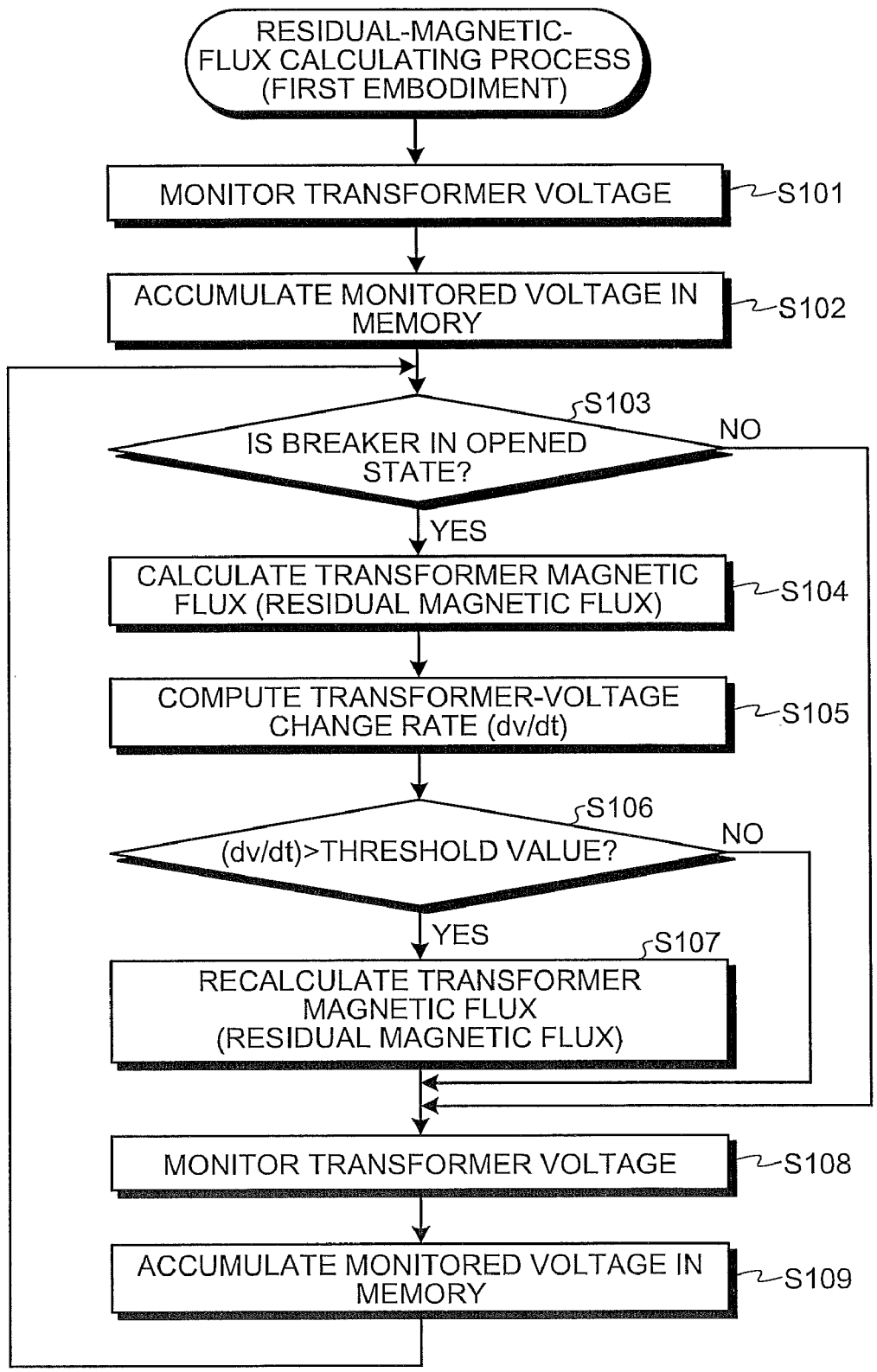
FIG. 2 is a flowchart for explaining a residual-magnetic-flux calculating process according to the first embodiment.
Figure 3:
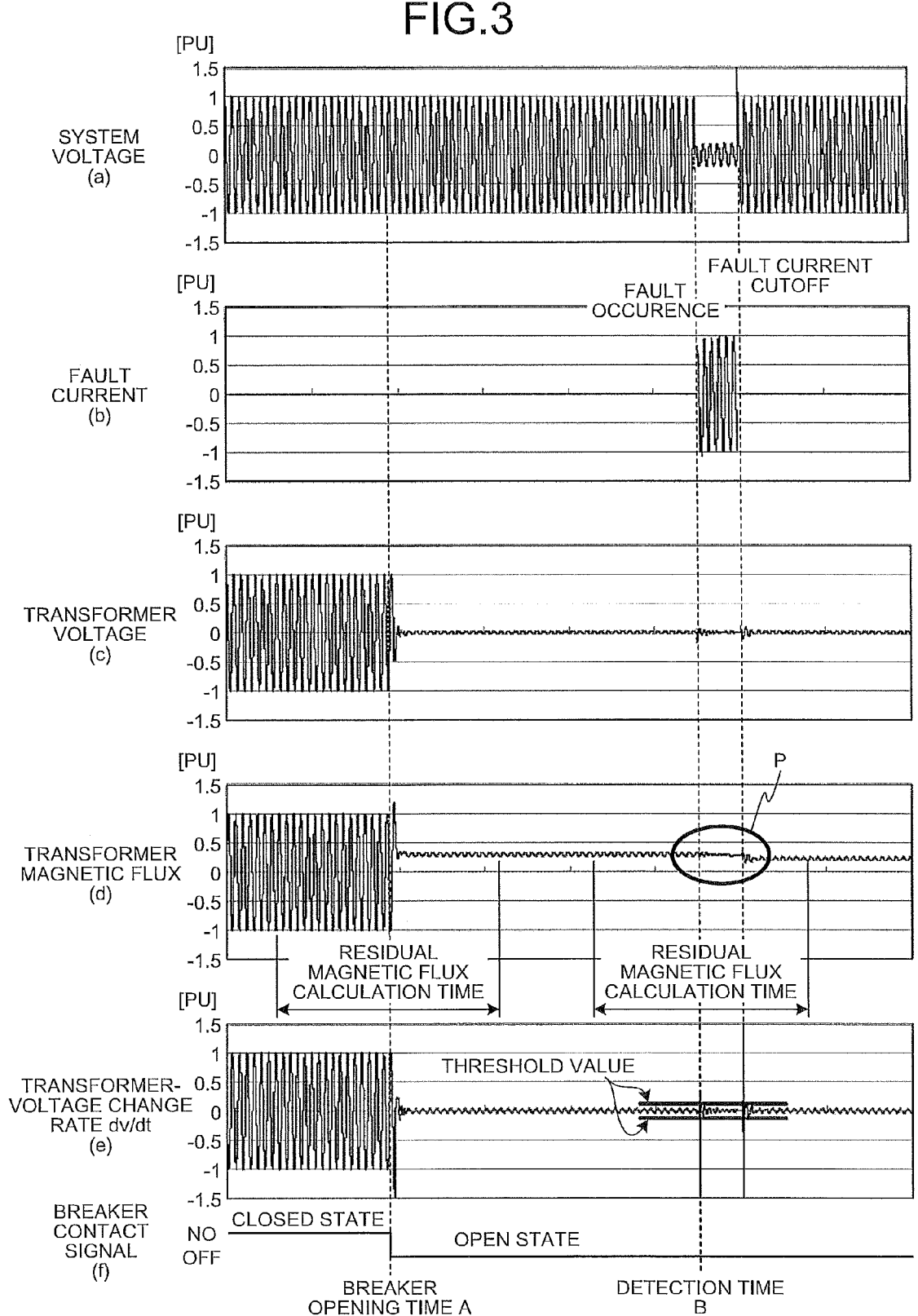
FIG. 3 is a waveform diagram of a relevant portion required for explaining the residual-magnetic-flux calculating process according to the first embodiment.
Figure 4:
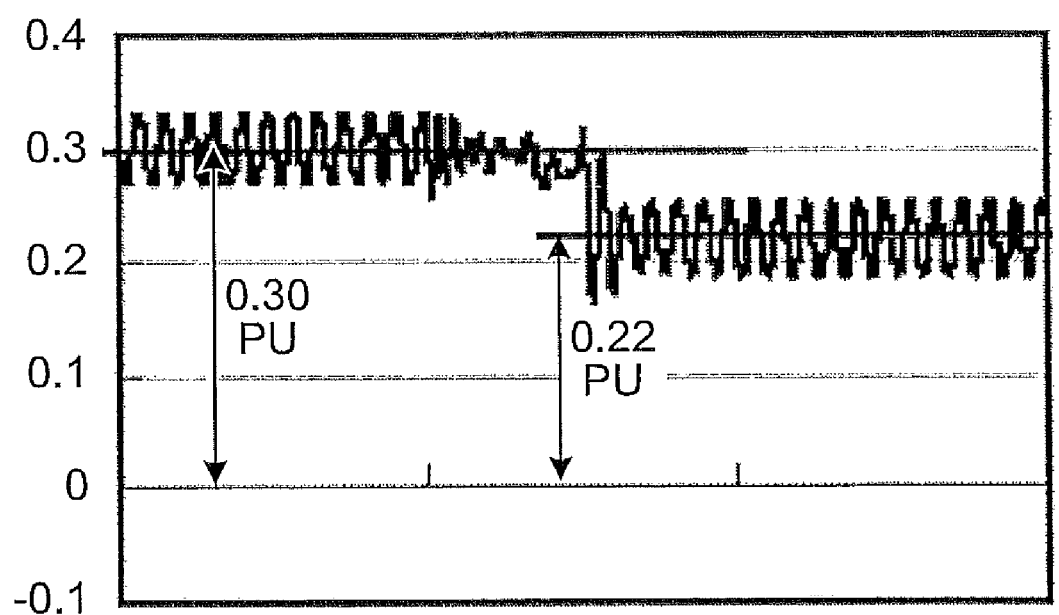
FIG. 4 is a partially-enlarged diagram of a waveform of a transformer magnetic flux shown in FIG. 3.

The operations of the phase-control switching apparatus shown in FIG. 1 will be explained with reference to FIG. 1 to FIG. 4. FIG. 2 is a flowchart for explaining a residual-magnetic-flux calculating process according to the first embodiment. FIG. 3 is a waveform diagram of a relevant portion required for explaining the residual-magnetic-flux calculating process according to the first embodiment. FIG. 4 is a partially-enlarged diagram of a waveform of a transformer magnetic flux shown in FIG. 3. In this case, although actual operations are performed on three phases, operations for only one phase are explained and operations for the other phases are not explained for simplification of explanation.

First, each waveform shown in FIG. 3 is explained. (c) of FIG. 3 is a waveform of a transformer voltage output from the voltage measuring unit 35. (d) of FIG. 3 is a waveform of a transformer magnetic flux obtained by integrating a transformer voltage, which is output from the voltage measuring unit 35 and is input into the residual-magnetic-flux detecting unit 53, with respect to time. (e) of FIG. 3 is a waveform of a transformer-voltage change rate (dv/dt) obtained by differentiating the transformer voltage, which is output from the voltage measuring unit 35 and is input into the voltage-change-rate detecting unit 52a, with respect to time. (f) of FIG. 3 is a waveform diagram of a switching contact signal of each phase, that is, a switching state of the breaker 10, which is output from the breaker 10 to the breaker-switching-state identifying unit 51. Assuming, for example, that a ground fault occurs on the electric power system side, and waveforms of a system voltage and a fault current when the ground fault occurs are illustrated as (a) of FIG. 3 and (b) of FIG. 3, respectively, to easily understand the operations of the phase-control switching apparatus according to the present embodiment.

The operations of the residual-magnetic-flux calculating unit 50a are explained with reference to the flowchart shown in FIG. 2.

First, the voltage measuring unit 35 monitors a transformer voltage (Step S101). The monitored voltage is accumulated in a predetermined memory (not shown) included in the residual-magnetic-flux calculating unit 50a (Step S102). The breaker-switching-state identifying unit 51 determines whether the breaker 10 is in an open state based on an on/off signal of a switching contact signal or a switching auxiliary contact signal output from the breaker 10 (Step S103).

When the breaker 10 is not in an open state, in other words, the breaker 10 is in a closed state (No at Step S103), the system control proceeds to Step S108. At this time, similarly to the above-described Steps S101 and S102, the monitoring of the transformer voltage (Step S108) and the process for accumulating the monitored voltage in the memory (Step S109) are continued and then the determination process at the present Step S103 is executed. On the other hand, when the breaker 10 is in an open state (Yes at Step S103, a breaker opened time A (see (f) of FIG. 3)), the residual-magnetic-flux detecting unit 53 calculates a transformer magnetic flux (a residual magnetic flux) (Step S104). In this case, a data width (a calculation time period of the residual magnetic flux (see FIG. 3)) for the calculation of the residual magnetic flux is arbitrary, and the residual magnetic flux is calculated based on the data accumulated in the memory for a predetermined time period around the breaker opened time A. The calculated residual magnetic flux is stored in the memory as control data for determining an optimum closing time at which an exciting inrush current becomes minimal when the breaker is closed next time.

Assuming that a fault current as shown in (b) of FIG. 3 flows due to a ground fault on a side of the electric power system. In this case, even if the breaker 10 is in an open state, the transformer voltage as shown in (c) of FIG. 3 fluctuates and the transformer magnetic flux as shown in (d) of FIG. 3 fluctuates, through an interpolar capacitor 20 (see FIG. 1) of the breaker 10, because the system voltage shown in (a) of FIG. 3 fluctuates largely for a while after cutoff of the fault current from the time of occurrence of the ground fault. For example, an enlarged waveform of the transformer magnetic flux in a predetermined time period (P portion) after cutoff of the fault current from the time of occurrence of the ground fault is illustrated in FIG. 4. In FIG. 4, the peak value of the transformer magnetic flux is decreased to about 70% (0.30 PU→0.22 PU) around the cutoff of the fault current, and thus the transformer magnetic flux fluctuates largely. Therefore, processes for detecting the fluctuation of the transformer voltage and always storing the latest transformer magnetic flux as a residual magnetic flux value are performed at the following Steps S105 to S107.

Specifically, the voltage-change-rate detecting unit 52a computes a transformer-voltage change rate (dv/dt) that is obtained by differentiating the voltage value measured by the voltage measuring unit 35 with respect to time after the calculation of the residual magnetic flux for each phase has been completed at the time of the cutoff of the transformer without load (Step S105). The voltage-change-rate detecting unit 52a also detects whether the voltage-change-rate (dv/dt) exceeds a predetermined threshold (Step S106). At this time, the voltage-change-rate detecting unit 52a further detects a time at which the voltage-change-rate (dv/dt) exceeds the threshold (a detection time B in (f) of FIG. 3). When the voltage-change-rate (dv/dt) exceeds the predetermined threshold (Yes at Step S106), the voltage-change-rate detecting unit 52a outputs the detection time to the residual-magnetic-flux detecting unit 53. Then, the residual-magnetic-flux detecting unit 53 recalculates a residual magnetic flux for each phase based on a transformer voltage around the detection time and causes the memory to store the recalculated residual magnetic flux value as a new residual magnetic flux value (Step S107). On the other hand, when the voltage-change-rate (dv/dt) does not exceed the predetermined threshold (No at Step S106), the system control proceeds to Step S108 without the recalculation process (Step S107) for a residual magnetic flux.

As described above, according to the phase-control switching apparatus of the present embodiment, the residual-magnetic-flux calculating unit detects whether the voltage-change-rate (dv/dt) of the transformer exceeds a preset threshold and recalculates a residual magnetic flux for each phase of the transformer when the change rate (dv/dt) exceeds the threshold. Therefore, an exciting inrush current at the time of closing the breaker can be suppressed even if the breaker for the transformer includes the interpolar capacitor.

Although the transformer-voltage change rate (dv/dt) is computed after the breaker shifts to an open state in the flowchart of FIG. 2, the transformer-voltage change rate (dv/dt) can be computed regardless of whether the breaker is in an open state.

Second Embodiment

Configuration of Apparatus

Figure 5:
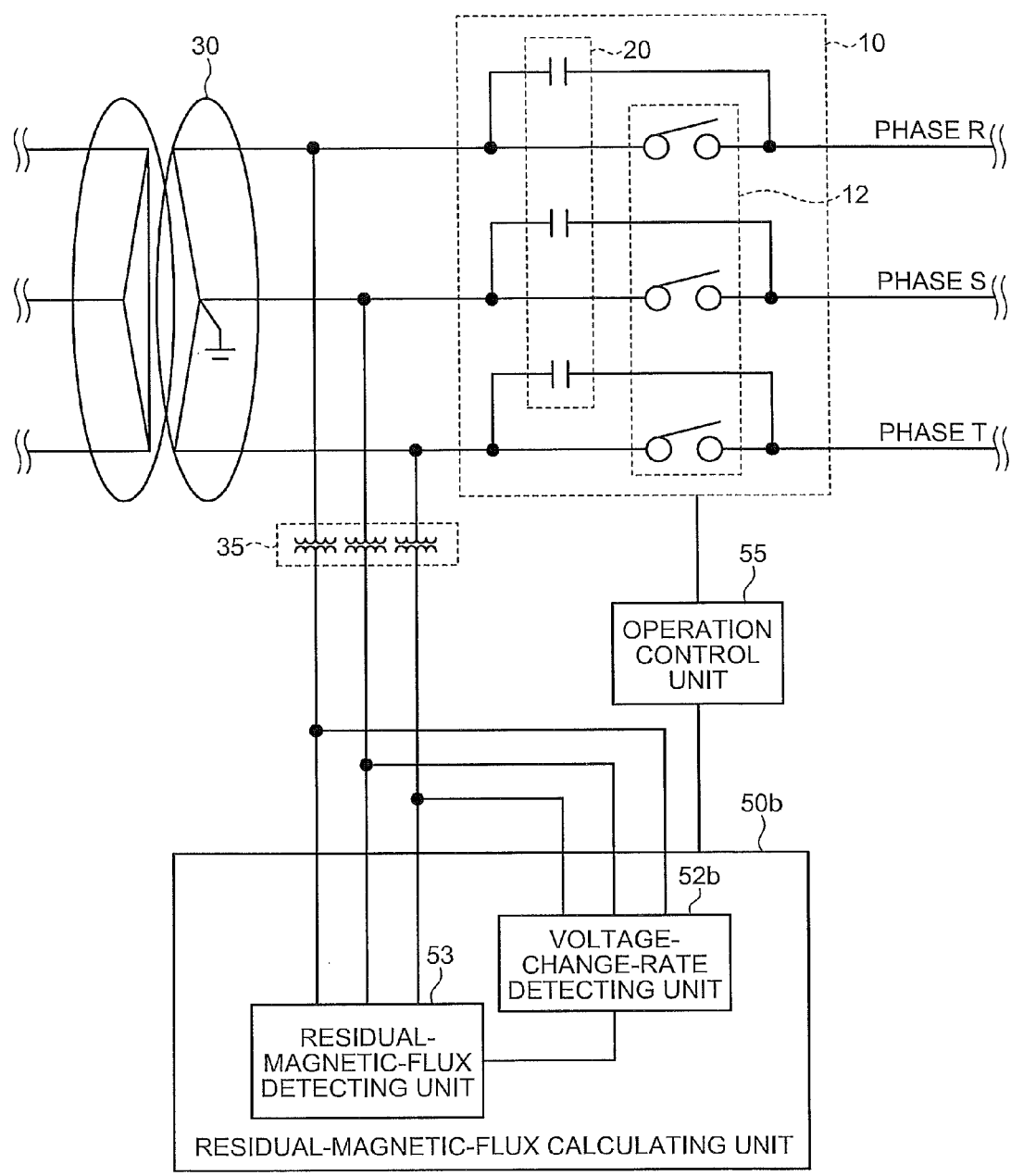
FIG. 5 is a schematic diagram illustrating a configuration of a relevant portion of a phase-control switching apparatus according to a second embodiment of the present invention.

FIG. 5 is a schematic diagram illustrating a configuration of a relevant portion of a phase-control switching apparatus according to a second embodiment of the present invention. The phase-control switching apparatus includes the breaker 10, the calculation/operation control unit 55, and a residual-magnetic-flux calculating unit 50b. In FIG. 5, the residual-magnetic-flux calculating unit 50b of the phase-control switching apparatus according to the second embodiment does not include the breaker-switching-state identifying unit 51 of the first embodiment shown in FIG. 1 and includes a voltage-change-rate detecting unit 52b having a function different from that of the voltage-change-rate detecting unit 52a of the first embodiment. In other words, the residual-magnetic-flux calculating unit 50b according to the present embodiment does not require a switching contact signal input from the breaker 10. Because the other components are the same as or similar to the components of the first embodiment, the same or similar components are denoted by the same reference numbers and the explanations thereof are omitted.

(Operation of Apparatus)

Figure 6:
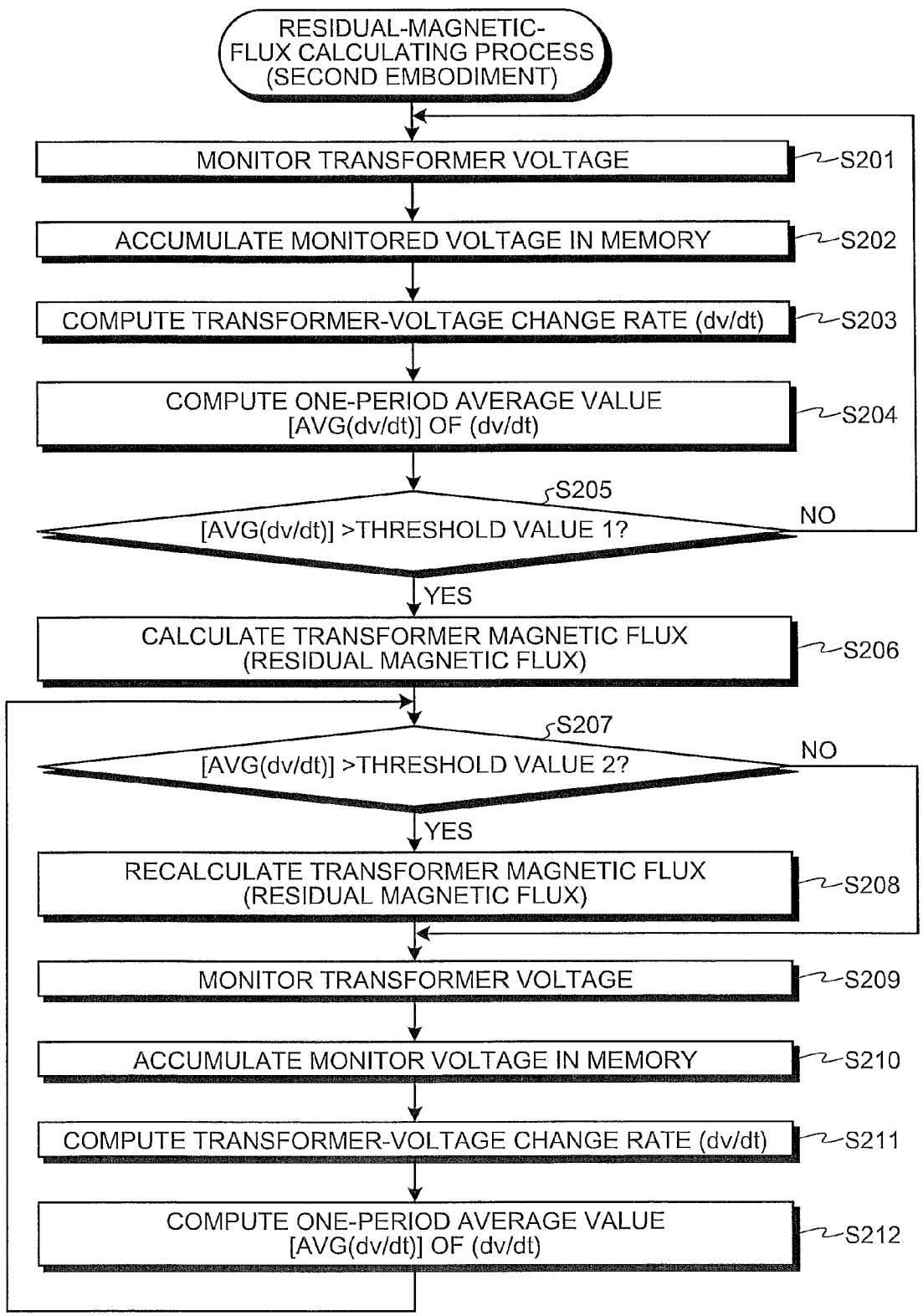
FIG. 6 is a flowchart for explaining a residual-magnetic-flux calculating process according to the second embodiment.
Figure 7:
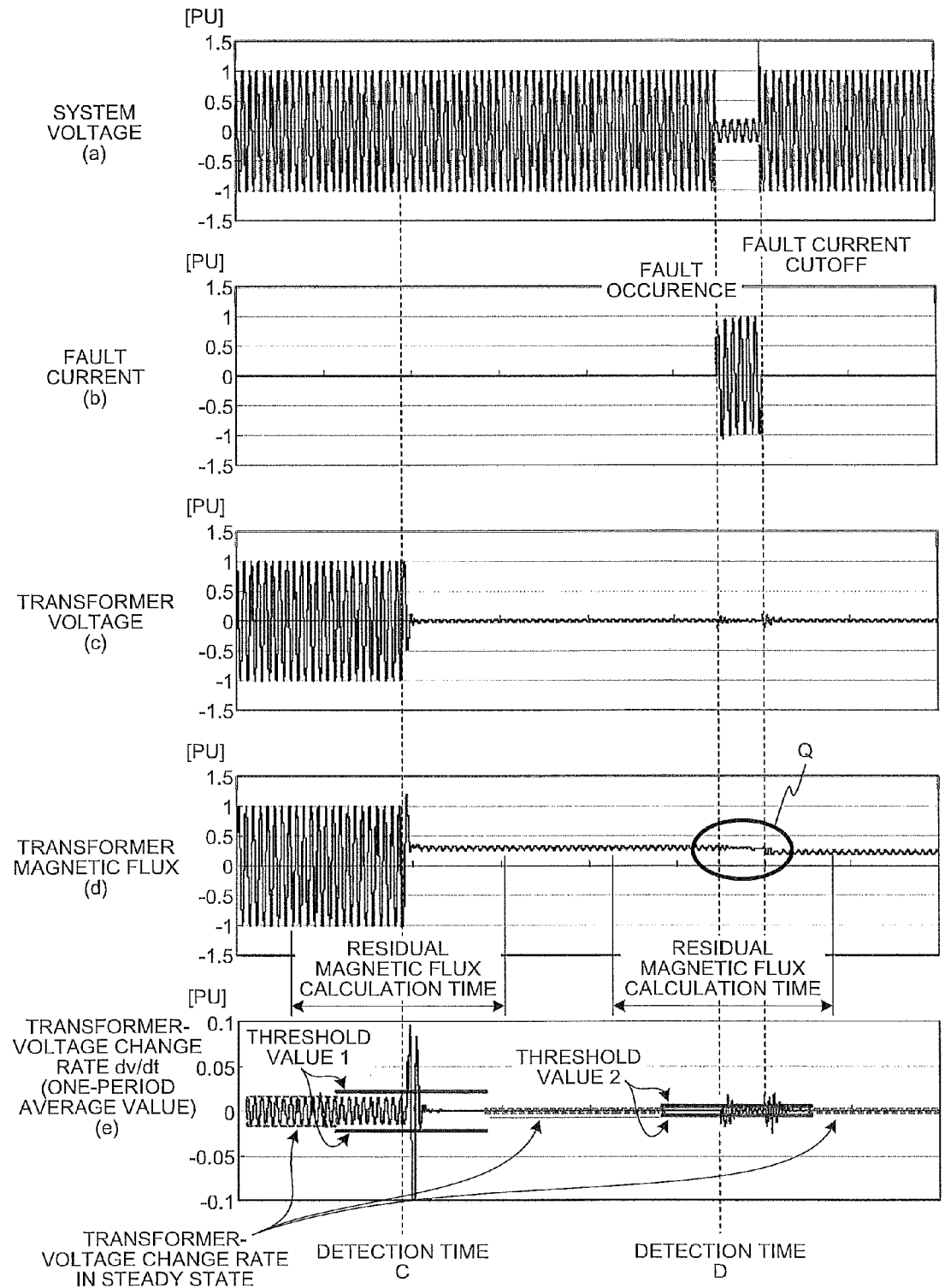
FIG. 7 is a waveform diagram of a relevant portion required for explaining the residual-magnetic-flux calculating process according to the second embodiment.

The operations of the phase-control switching apparatus shown in FIG. 5 will be explained with reference to FIG. 5 to FIG. 7. FIG. 6 is a flowchart for explaining a residual-magnetic-flux calculating process according to the second embodiment. FIG. 7 is a waveform diagram of a relevant portion required for explaining the residual-magnetic-flux calculating process according to the second embodiment. In this case, although actual operations are performed on three phases, operations for only one phase are explained and operations for the other phases are not explained for simplification of explanation.

First, each waveform shown in FIG. 7 is explained. (c) of FIG. 7 is a waveform of a transformer voltage output from the voltage measuring unit 35. (d) of FIG. 7 is a waveform of a transformer magnetic flux obtained by integrating a transformer voltage, which is output from the voltage measuring unit 35 and is input into the residual-magnetic-flux detecting unit 53, with respect to time. (e) of FIG. 7 is a waveform of a one-period average of a transformer-voltage change rate (dv/dt) obtained by differentiating the transformer voltage, which is output from the voltage measuring unit 35 and is input into the voltage-change-rate detecting unit 52b, with respect to time. The difference between (e) of FIG. 3 and (e) of FIG. 7 is that (e) of FIG. 3 is a waveform of a transformer-voltage change rate (dv/dt) and (e) of FIG. 7 is a waveform of a one-period average value of the transformer-voltage change rate (dv/dt). Assuming, for example, that a ground fault occurs on the electric power system side, and waveforms of a system voltage and a fault current when the ground fault occurs are illustrated in (a) of FIG. 7 and (b) of FIG. 7 to easily understand the operations of the phase-control switching apparatus according to the second embodiment.

The operations of the residual-magnetic-flux calculating unit 50b are explained with reference to the flowchart shown in FIG. 6.

First, the voltage measuring unit 35 monitors a transformer voltage (Step S201). The monitored voltage is accumulated in a predetermined memory (not shown) included in the residual-magnetic-flux calculating unit 50b (Step S202). The voltage-change-rate detecting unit 52b computes a transformer-voltage change rate (dv/dt) that is obtained by differentiating with respect to time the voltage value measured by the voltage measuring unit 35 and a one-period average value thereof (hereinafter, [AVG(dv/dt)] (Steps S203 and S204), and detects whether [AVG(dv/dt)] exceeds a predetermined threshold 1 (a first threshold) (Step S205).

When [AVG(dv/dt)] does not exceed the threshold 1 (No at Step S205), because it is determined that the breaker 10 is not in a closed state, the system control returns to Step S201 and the above-described Steps S201 to S205 are continued. On the other hand, when [AVG(dv/dt)] exceeds the threshold 1 (Yes at Step S205), because it is determined that the breaker 10 has shifted to an open state (a detection time C (see (e) of FIG. 7), the residual-magnetic-flux detecting unit 53 calculates a transformer magnetic flux (a residual magnetic flux) (Step S206). In this case, a data width (a calculation time period of the residual magnetic flux (see FIG. 7)) for the calculation of the residual magnetic flux is arbitrary, and the residual magnetic flux is calculated based on the data accumulated in the memory for a predetermined time period around the detection time C. The calculated residual magnetic flux is stored in the memory as control data for determining an optimum closing time at which an exciting inrush current becomes minimal when the breaker is closed next time.

Assuming that a fault current as shown in (b) of FIG. 7 flows due to a ground fault on a side of the electric power system. In this case, even if the breaker 10 is in an open state, the transformer voltage as shown in (c) of FIG. 7 fluctuates and the transformer magnetic flux as shown in (d) of FIG. 7 fluctuates, through the interpolar capacitor 20 (see FIG. 5) of the breaker 10, because the system voltage as shown in (a) of FIG. 7 fluctuates largely for a while after cutoff of the fault current from the time of occurrence of the ground fault. For example, as explained with reference to FIG. 4, the peak value of the transformer magnetic flux is decreased to about 70% (0.30 PU→0.22 PU), and thus the transformer magnetic flux fluctuates largely. Therefore, processes for detecting the fluctuation of the transformer voltage and always storing the latest transformer magnetic flux as a residual magnetic flux value are performed at the following Steps S207 to S212.

Specifically, the voltage-change-rate detecting unit 52b detects whether [AVG(dv/dt)] exceeds a predetermined threshold 2 (a second threshold) (Step S207). When [AVG(dv/dt)] exceeds the threshold 2 (Yes at Step S207), the voltage-change-rate detecting unit 52b outputs the detection time (a detection time D (see (e) of FIG. 7) to the residual-magnetic-flux detecting unit 53. Then, the residual-magnetic-flux detecting unit 53 recalculates a residual magnetic flux for each phase based on a transformer voltage around the detection time and causes the memory to store the recalculated residual magnetic flux value as a new residual magnetic flux value (Step S208). On the other hand, when [AVG(dv/dt)] does not exceed the threshold 2 (No at Step S207), the system control proceeds to Step S209 without the recalculation process of the residual magnetic flux (Step S208). Then, similarly to the above-described Steps S201 to S204, a process for monitoring a transformer voltage (Step S209), a process for accumulating the monitor voltage in the memory (Step S210), a process for computing the transformer-voltage change rate (Step S211), a process for computing [AVG(dv/dt)] (Step S212), and the determination process of the Step S207 are continuously performed.

As described above, according to the phase-control switching apparatus of the present embodiment, the residual-magnetic-flux calculating unit detects whether the average value ([AVG(dv/dt)]) of the change rate of the transformer voltage (dv/dt) exceeds the preset threshold 1. Then, the residual-magnetic-flux calculating unit determines that the breaker shifts to an open state when [AVG(dv/dt)] exceeds the threshold 1 and also recalculates a residual magnetic flux for each phase of the transformer when [AVG(dv/dt)] further exceeds the threshold 2. Therefore, an exciting inrush current at the time of closing the breaker can be suppressed even if the breaker for the transformer includes the interpolar capacitor.

Moreover, because the phase-control switching apparatus according to the second embodiment does not require an on/off signal of a switching contact signal or a switching auxiliary contact signal output from the breaker 10 unlike the first embodiment, a configuration of the apparatus can be simplified.

The threshold 1 and the threshold 2 can independently be set. For example, the threshold 1 can be set as a value that is obtained by multiplying an amplitude value expected as [AVG(dv/dt)] in a closed state of the breaker by m (m is a real number satisfying m>1). The threshold 2 can be set as a value that is obtained by multiplying an amplitude value expected as [AVG(dv/dt)] in an open state of the breaker by n (n is a real number satisfying n>1).

On the other hand, when the amplitude value of (dv/dt) and the amplitude value of [AVG(dv/dt)] become a steady state in which they are continuously a substantially constant value for a certain time, the substantially constant amplitude value can be set as a reference value. Furthermore, a value obtained by multiplying the reference value by x (x is a real number satisfying x>1) can be reset as the threshold 1 and the threshold 2. Detection sensitivity can be improved while maintaining predetermined detection accuracy by setting the threshold 1 and the threshold 2 to the same value.

Moreover, according to the second embodiment, the determination of whether the breaker is in an open state and the determination of whether the residual magnetic flux is recalculated are performed based on the one-period average value of the transformer-voltage change rate (dv/dt). However, these determinations can be performed based on the transformer-voltage change rate (dv/dt) similarly to the first embodiment. However, when these determinations are performed by using the transformer-voltage change rate (dv/dt), it is required to set the first threshold to an appropriate value because a margin for determining whether the breaker is in an open state is small.

Alternatively, the determination of whether the residual magnetic flux is recalculated can be performed based on the transformer-voltage change rate (dv/dt) while the determination of whether the breaker is in an open state is performed based on the one-period average value of the transformer-voltage change rate (dv/dt). Moreover, the determination of whether the breaker is in an open state can be performed based on the change rate of the transformer magnetic flux.

When at least one of the transformer-voltage change rate (dv/dt) and the one-period average value [AVG(dv/dt)] of the transformer-voltage change rate shifts to a steady state in which a value is substantially constant for a predetermined time period, the residual-magnetic-flux calculating unit can set, as a reference value, (dv/dt) or [AVG(dv/dt)] having a substantially constant value and reset a value obtained by multiplying the reference value by x (x is a real number satisfying x>1) as the threshold 1 and the threshold 2. In this case, the process flow shown in FIG. 2 can be performed in place of the process flow shown in FIG. 6. The threshold determination process can use either (dv/dt) or [AVG(dv/dt)] having a substantially constant value. For example, when using (dv/dt), the process flow shown in FIG. 2 can be executed. On the other hand, when using [AVG(dv/dt)], the one-period average value [AVG(dv/dt)] of the transformer-voltage change rate can be computed at the process of Step S105 shown in FIG. 2 and the threshold determination process by the computed [AVG(dv/dt)] can be performed at the process of Step S106.

INDUSTRIAL APPLICABILITY

As described above, the phase-control switching apparatus and the switching control method therefor according to the present invention are useful as an apparatus and a method that can suppress the generation of a transient exciting inrush current in a transformer connected to an electric power system via a power switching device such as a breaker.

The invention claimed is:

1. A phase-control switching apparatus comprising:
a breaker that is connected between an electric power system and a transformer and is controlled to cut off or energize the transformer;
a voltage measuring unit that measures each phase voltage between the breaker and the transformer;
a residual-magnetic-flux calculating unit that calculates a residual magnetic flux remaining on the transformer; and
a control unit that controls a switching timing of the breaker based on the residual magnetic flux, wherein
the residual-magnetic-flux calculating unit includes
a voltage-change-rate detecting unit that detects a transformer-voltage change rate for each phase obtained by differentiating the phase voltage with respect to time,
a residual-magnetic-flux detecting unit that detects the residual magnetic flux based on the phase voltage, and
a breaker-switching-state identifying unit that detects a switching state of the breaker, and
the residual-magnetic-flux detecting unit determines whether to recalculate the residual magnetic flux based on the transformer-voltage change rate and a predetermined threshold while the breaker-switching-state identifying unit detects that the breaker is in an open state, and when it is determined to recalculate the residual magnetic flux, recalculates the residual magnetic flux.

2. The phase-control switching apparatus according to claim 1, wherein the residual-magnetic-flux detecting unit calculates the residual magnetic flux by using measured data for a predetermined period before and after an open time of the breaker, and recalculates the residual magnetic flux by using measured data for a predetermined period before and after a time at which the residual magnetic flux is determined to be recalculated.

3. A phase-control switching apparatus comprising:
a breaker that is connected between an electric power system and a transformer and is controlled to cut off or energize the transformer;
a voltage measuring unit that measures each phase voltage between the breaker and the transformer;
a residual-magnetic-flux calculating unit that calculates a residual magnetic flux remaining on the transformer; and
a control unit that controls a switching timing of the breaker based on the residual magnetic flux, wherein
the residual-magnetic-flux calculating unit includes
a voltage-change-rate detecting unit that detects an average value in one period of a transformer-voltage change rate for each phase obtained by differentiating the phase voltage with respect to time, and
a residual-magnetic-flux detecting unit that detects the residual magnetic flux based on the phase voltage, and
the residual-magnetic-flux detecting unit determines a switching state of the breaker based on a predetermined first threshold and the average value of the transformer-voltage change rate, when it is determined that the breaker is in an open state, determines whether to recalculate the residual magnetic flux based on a predetermined second threshold that is different from the first threshold and the transformer-voltage change rate, and when it is determined to recalculate the residual magnetic flux, recalculates the residual magnetic flux.

4. The phase-control switching apparatus according to claim 3, wherein the residual-magnetic-flux detecting unit calculates the residual magnetic flux by using measured data for a predetermined period before and after an open time of the breaker, and recalculates the residual magnetic flux by using measured data for a predetermined period before and after a time at which the residual magnetic flux is determined to be recalculated.

5. The phase-control switching apparatus according to claim 3, wherein when at least one of the transformer-voltage change rate and the average value of the transformer-voltage change rate shifts to a steady state with substantially constant values for a predetermined time, the residual-magnetic-flux calculating unit sets either one of the transformer-voltage change rate and the average value of the transformer-voltage change rate as a reference value, and resets a value obtained by multiplying the reference value by x, where x is a positive integer larger than one, as the first threshold and the second threshold.

6. The phase-control switching apparatus according to claim 4, wherein when at least one of the transformer-voltage change rate and the average value of the transformer-voltage change rate shifts to a steady state with substantially constant values for a predetermined time, the residual-magnetic-flux calculating unit sets either one of the transformer-voltage change rate and the average value of the transformer-voltage change rate as a reference value, and resets a value obtained by multiplying the reference value by x, where x is a positive integer larger than one, as the first threshold and the second threshold.

7. A switching control method for a phase-control switching apparatus, wherein
the phase-control switching apparatus includes
a breaker that is connected between an electric power system and a transformer and is controlled to cut off or energize the transformer,
a voltage measuring unit that measures each phase voltage between the breaker and the transformer,
a residual-magnetic-flux calculating unit that calculates a residual magnetic flux remaining on the transformer based on the phase voltage, and
a control unit that controls a switching timing of the breaker based on the residual magnetic flux, and
the switching control method comprises:
detecting including the residual-magnetic-flux calculating unit calculating a transformer-voltage change rate for each phase obtained by differentiating the phase voltage with respect to time;
first determining including the residual-magnetic-flux calculating unit determining a switching state of the breaker;
second determining including the residual-magnetic-flux calculating unit determining whether to recalculate the residual magnetic flux based on the transformer-voltage change rate when it is determined that the breaker is in an open state; and
recalculating including the residual-magnetic-flux calculating unit recalculating, when it is determined to recalculate the residual magnetic flux, the residual magnetic flux.

8. A switching control method for a phase-control switching apparatus, wherein
the phase-control switching apparatus includes a breaker that is connected between an electric power system and a transformer and is controlled to cut off or energize the transformer, a voltage measuring unit that measures each phase voltage between the breaker and the transformer, a residual-magnetic-flux calculating unit that calculates a residual magnetic flux remaining on the transformer based on the phase voltage, and a control unit that controls a switching timing of the breaker based on the residual magnetic flux, and the switching control method comprises:

detecting including the residual-magnetic-flux calculating unit calculating an average value in one period of a transformer-voltage change rate for each phase obtained by differentiating the phase voltage with respect to time;

first determining including the residual-magnetic-flux calculating unit determining a switching state of the breaker based on a predetermined first threshold and the average value of the transformer-voltage change rate;

second determining including the residual-magnetic-flux calculating unit determining whether to recalculate the residual magnetic flux based on a predetermined second threshold different from the first threshold and the average value of the transformer-voltage change rate when it is determined that the breaker is in an open state; and recalculating including the residual-magnetic-flux calculating unit recalculating, when it is determined to recalculate the residual magnetic flux, the residual magnetic flux.

9. The switching control method according to claim 8, further comprising:

setting including the residual-magnetic-flux calculating unit setting, when at least one of the transformer-voltage change rate and the average value of the transformer-voltage change rate shifts to a steady state with substantially constant values for a predetermined time, one of the transformer-voltage change rate and the average value of the transformer-voltage change rate as a reference value; and resetting including the residual-magnetic-flux calculating unit resetting a value obtained by multiplying the reference value by x, where x is a positive integer larger than one, as the first threshold and the second threshold.

\* \* \* \* \*